(12) United States Patent  (10) Patent No.: US 7,495,854 B2
Hutchins et al.  (45) Date of Patent: Feb. 24, 2009

(54) DYNAMIC METHOD FOR ASYMMETRY COMPENSATION IN A STORAGE READ CHANNEL

(75) Inventors: Robert Allen Hutchins, Tucson, AZ (US); Evangelos S. Eleftheriou, Zurich (CH); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 11/242,343

(22) Filed: Oct. 3, 2005

(65) Prior Publication Data

US 2007/0076313 A1   Apr. 5, 2007

(51) Int. Cl.
G11B 5/09 (2006.01)
G11B 5/02 (2006.01)
G06F 11/00 (2006.01)
G06F 11/30 (2006.01)
G08C 25/00 (2006.01)
H03M 13/00 (2006.01)

(52) U.S. Cl. .......................... 360/46; 360/67; 714/746
(58) Field of Classification Search ....................... None
See application file for complete search history.

(56) References Cited

U.S. PATENT DOCUMENTS 3,916,180 A  10/1975 Turtle
6,043,943 A  3/2000  Rezzi et al.
6,519,715 B1 *  2/2003  Takashi et al. ................. 714/32
6,587,292 B1  7/2003  Ashley et al.
6,633,447 B2  10/2003  Franck et al.
7,382,561 B1 *  6/2008  Hung .......................... 360/46

OTHER PUBLICATIONS

U.S. Patent Application entitled "Apparatus, System, and Method for Mitigating Signal Asymmetry", U.S. Appl. No. 10/966,531, filed Oct. 15, 2004, by inventors E. Eleftheriou, E. Gale, R. Hutchins, G. Jaquette, and S. Oelcer.
E.R. Childers, "Six Orders of Magnitude in Linear Tape Technology: The One-Terabyte Project", IBM J. Res. & Dev., vol. 47, No. 4, Jul. 2003, pp. 471-482.
Document from China Patent Office dated Nov. 7, 2008 citing prior art.

* cited by examiner

Primary Examiner—Joseph H Feild
Assistant Examiner—Daniell L Negrón
(74) Attorney, Agent, or Firm—David W. Victor; Konrad Raynes & Victor LLP

(57) ABSTRACT

Provided is a dynamic method for asymmetry compensation in a storage read channel. An asymmetry cancellation component in communication with an analog-to-digital converter receives an analog signal representing data read from a storage medium by a read head. The asymmetry cancellation component receives a digital signal from the analog-to-digital converter representing data read from the storage medium and computes an error signal indicating an asymmetry in the digital signal. The computed error signal is used to determine a coefficient. The digital signal is adjusted using the coefficient to produce a corrected digital signal.

22 Claims, 4 Drawing Sheets

DYNAMIC METHOD FOR ASYMMETRY COMPENSATION IN A STORAGE READ CHANNEL

BACKGROUND OF THE INVENTION

1. Field of the Invention

The present invention relates to a system and device for dynamic method for asymmetry compensation in a storage read channel.

2. Description of the Related Art

During the read process in a data storage device, a read head is passed over a data record in order to convert pre-recorded data into an analog signal. For example, in a magnetic tape drive, a magneto-resistive read head ("MRRH") is passed over a data record written as flux reversals on a magnetic tape. As the MRRH passes over the tape, the MRRH converts the flux reversals into an electrical analog signal that represents the data originally stored on the magnetic tape. An analog to digital converter ("ADC") periodically samples the analog signal and converts the sampled analog signal to a digital input signal. The ADC typically samples and converts a plurality of digital input signals forming a digital waveform. A data storage device such as a magnetic media storage device processes the digital waveform to reconstruct the data that was originally written to the tape.

The data waveform is typically recorded as flux reversals on a magnetic media and is symmetric, such that if the MRRH was perfectly adjusted, the received analog signal would be symmetric about a known reference level. For example, the analog signal may be symmetric about a reference level of zero volts (0 V). Unfortunately, manufacturing inconsistencies and read head wear may cause the read head to generate an asymmetric analog signal from the magnetic media. The asymmetric analog signal is converted to a plurality of digital input signals forming an asymmetric digital waveform. The asymmetry in the digital waveform increases the probability that the data storage device will interpret the asymmetric digital input signal incorrectly, resulting in an increased number of data errors.

Data errors due to a read head generating an asymmetric analog signal may make the read head unsuitable for shipment in a magnetic media storage device, increasing the failure rate and manufacturing costs of the read head. In addition, as the read head wears over time, the analog signals generated by these worn read heads will become more asymmetric. This shortens the life of the read head and the data storage device, increases the probability of an uncorrectable read error, and increases warranty costs.

The copending and commonly assigned patent application entitled "Apparatus, System, and Method for Mitigating Signal Asymmetry", by Evangelos S. Eleftheriou, Ernest S. Gale, Robert A. Hutchins, Glen A. Jaquette, and Sedat Oelcer, having U.S. application Ser. No. 10/966,531 and filed Oct. 15, 2004, provides a technique to mitigate asymmetry using a look-up module to convert a sample from the analog digital converter (ADC) to a modified signal having fewer asymmetry errors.

There is a need for further techniques in the art to reduce asymmetry related errors.

SUMMARY

Provided is a dynamic method for asymmetry compensation in a storage read channel. An asymmetry cancellation component in communication with an analog-to-digital converter receives an analog signal representing data read from a storage medium by a read head. The asymmetry cancellation component receives a digital signal from the analog-to-digital converter representing data read from the storage medium and computes an error signal indicating an asymmetry in the digital signal. The computed error signal is used to determine a coefficient. The digital signal is adjusted using the coefficient to produce a corrected digital signal.

DETAILED DESCRIPTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
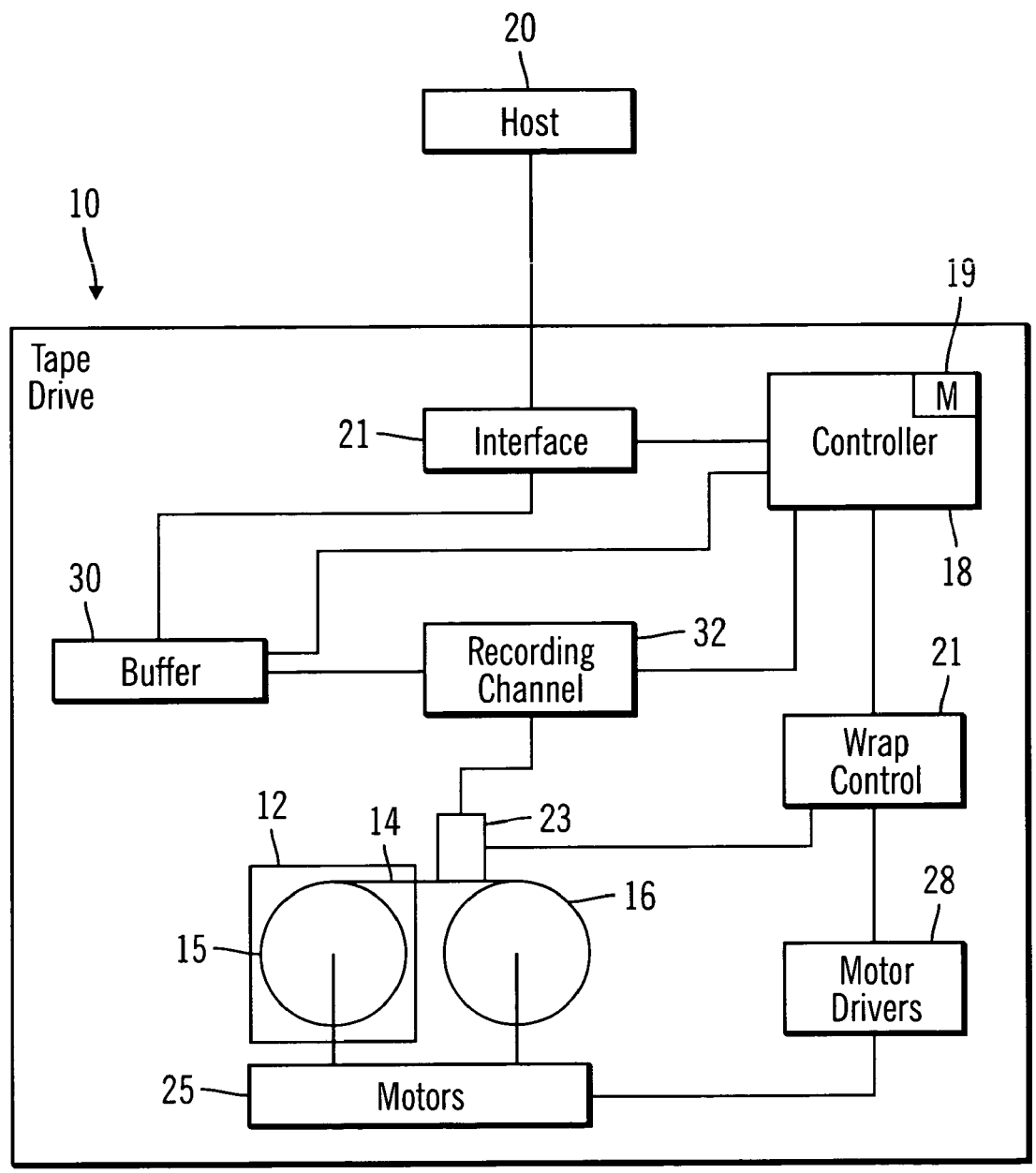
FIG. 1 illustrates an embodiment of a tape drive.

FIG. 1 illustrates an embodiment of a magnetic tape drive 10. The magnetic tape drive provides a means for reading and writing information with respect to a magnetic tape 14 of a magnetic tape cartridge 11. Magnetic tape cartridges include a magnet tape storage medium to store data to be saved and read at a subsequent time. Further, the magnetic tape cartridges may be interchanged between tape drives, such that a magnetic tape written on one tape drive will be read by another tape drive. The magnetic tape cartridge 11 comprises a length of magnetic tape 14 wound on one or two reels 15, 16.

A single reel magnetic tape cartridge 11 is illustrated, examples of which are those adhering to the Linear Tape Open (LTO) format. An example of a magnetic tape drive 10 is the IBM 3580 Ultrium magnetic tape drive based on LTO technology. A further example of a single reel magnetic tape drive and associated cartridge is the IBM 3592 Total Storage Enterprise magnetic tape drive and associated magnetic tape cartridge. An example of a dual reel cartridge is the IBM 3570 magnetic tape cartridge and associated drive. In alternative embodiments, additional tape formats that may be used include Digital Linear Tape (DLT), Digital Audio Tape (DAT), etc.

The magnetic tape drive 10 comprises one or more controllers 18 of a recording system for operating the magnetic tape drive in accordance with commands received from a host system 20 received at an interface 21. A controller typically comprises logic and/or one or more microprocessors with a memory 19 for storing information and program information for operating the microprocessor(s). The program information may be supplied to the memory via the interface 21, by an input to the controller 18 such as a floppy or optical disk, or by read from a magnetic tape cartridge, or by any other suitable means. The magnetic tape drive 10 may comprise a standalone unit or comprise a part of a tape library or other subsystem. The magnetic tape drive 10 may be coupled to the host system 20 directly, through a library, or over a network, and employ at interface 21 a Small Computer Systems Interface (SCSI), an optical fiber channel interface, etc. The magnetic tape cartridge 11 may be inserted in the magnetic tape drive 10, and loaded by the magnetic tape drive so that one or more read and/or write heads 23 of the recording system reads and/or writes information in the form of signals with respect to the magnetic tape 14 as the tape is moved longitudinally by two motors 25 which rotate the reels 15, 16. The magnetic tape typically comprises a plurality of parallel tracks, or groups of tracks. In certain tape formats, such as the LTO format, the tracks are arranged in a serpentine back and forth pattern of separate wraps, as is known to those of skill in the art. Also, the recording system may comprise a wrap control system 27 to electronically switch to another set of read and/or write heads, and/or to seek and move the read and/or write heads 23 laterally of the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18.

Controller 18 also provides the data flow and formatter for data to be read from and written to the magnetic tape, employing a buffer 30 and a recording channel 32, as is known to those of skill in the art.

The tape drive 10 system further includes motors 25 and reels 15, 16 to move the magnetic tape 14 with respect to the read head(s) 23 such that the read head(s) may detect magnetic signals on the magnetic tape. A read channel of the recording channel 32 digitally samples the magnetic signals detected by the read head(s) to provide digital samples of the magnetic signals for further processing.

Figure 2:
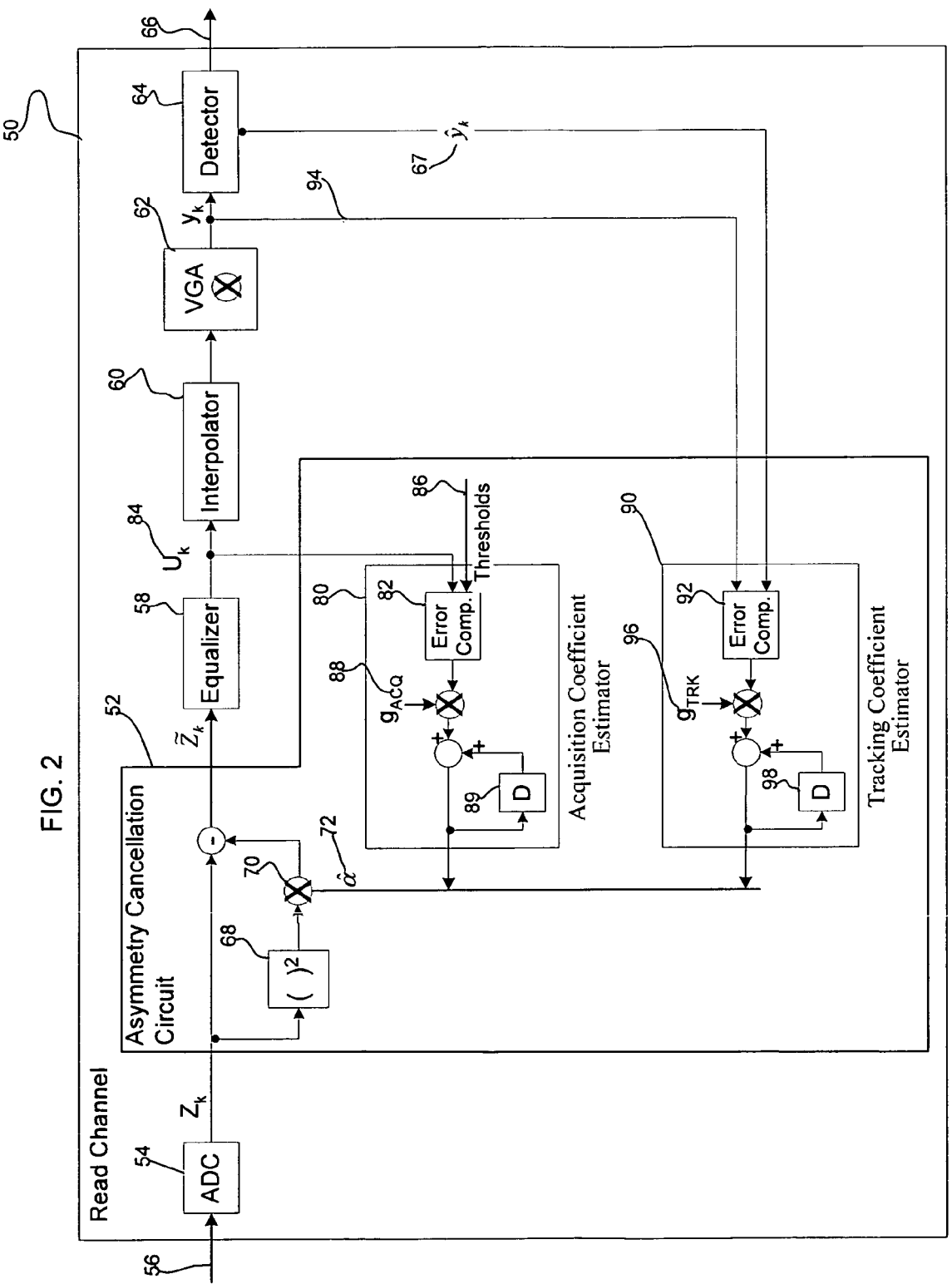
FIG. 2 illustrates an embodiment of a read channel and asymmetry cancellation circuit.

FIG. 2 illustrates an embodiment of a portion, but not all, of the components of a read channel 50 of the recording channel 32 of FIG. 1 including an embodiment of an asymmetry cancellation circuit 52 to provide digital samples of the magnetic signals detected by the read head 23. In embodiments where the read channel may concurrently read a plurality of parallel tracks, the recording channel 32 may comprise a plurality of read channels, in which some of the components may be shared.

With respect to FIG. 2, an analog-to-digital converter (ADC) 54 converts analog signals 56 read from tape to digital samples that can be processed by the read channel 50 components. The digital signal output ($Z_k$) of the ADC 54 is inputted to the asymmetry cancellation circuit 52 which processes the digital signal to reduce the effects of asymmetry and the likelihood of read errors in the manner described below. The adjusted digital signal from the asymmetry cancellation circuit 52 ($\tilde{Z}_k$) is provided as input to an equalizer 58. In one embodiment, the equalizer 58 may comprise a finite impulse response (FIR) filter having adjustable taps. The equalizer 58 modifies the digital samples to compensate for differences in the signal due to the magnetic recording properties of the write head, the magnetic tape, and the read head. The modification is based on a series of specific functions, whose coefficients may be adapted by an equalizer adaptor 58. The modified digital samples output by the equalizer 52 are supplied to an interpolator 60 comprising a timing circuit to space the signals into single samples that are spaced by a bit or symbol intervals.

Determination of the information content of the magnetic signals requires determining the timing or position of magnetic transitions of the magnetic signals. Typically, the sample signals 54 are taken asynchronously with respect to the clock used to write the data on the magnetic tape. The interpolator 58 interpolates the asynchronous samples into a set of samples that can be considered to be synchronous with the write clock or with the positions of the magnetic recording transitions. A variable gain amplifier circuit (VGA) 62, which may comprise a custom designed logic circuit, adjusts the gain on the signals from the interpolator 60 to scale the synchronous samples to optimal levels.

A detector 64, such as a Viterbi detector, receives the gain adjusted synchronous digital samples from the VGA 62 to determine the data information represented by the digital samples, i.e., a zero or one. The determined data information is outputted as signal 66, which is binary data representing data that was written on the tape, for further processing. In one embodiment, besides determining the data information, the detector 64 may compare the synchronized, gain adjusted equalizer output to desired values and determine the desired value that is closest, and then select that closet desired value as the detector 64 output ($\hat{y}_k$) shown as output value 67. This output ($\hat{y}_k$) is another output from the detector. The detector 64 output ($\hat{y}_k$) 67 may comprise a digitized, 8-bit word that is an estimate of the ideal signal at the output of the VGA 62.

In one embodiment, the asymmetry cancellation circuit 52 applies a coefficient a to the inputted digital signal ($Z_k$) to produce an output digital signal ($\tilde{Z}_k$) that is modified to reduce asymmetries in the signal. In one embodiment, the output digital signal ($\tilde{Z}_k$) is calculated according to the function (1) below.

$$\tilde{Z}_k = Z_k - \alpha \cdot Z_k^2 \qquad (1),$$

This equation (1) subtracts from the inputted digital signal ($Z_k$) the coefficient ($\alpha$) times the inputted digital signal ($Z_k$) squared. The asymmetry cancellation circuit 52 may include a circuit 68 to square the inputted digital signal ($Z_k$) and a multiplication circuit 70 to multiply the coefficient ($\alpha$) 72 times the squared inputted digital signal ($Z_k$)$^2$.

The coefficient ($\alpha$) may vary depending on whether the inputted digital signal comprises initialization information, such as data set separators (DSS), that is read during an acquisition phase. In one embodiment, the DSS is used to initialize the read channel 50. Upon the first read information stored on tape, the head asymmetry is unknown. The coefficient ($\alpha$) may also vary when the inputted digital signal comprises user data read during a tracking phase.

The asymmetry cancellation circuit 52 includes an acquisition coefficient ($\alpha$) estimator 80 to calculate the coefficient ($\alpha$) when the acquisition information, e.g., DSS, is being read and a tracking coefficient ($\alpha$) estimator 90 to calculate the coefficient ($\alpha$) when data is being read during a tracking phase following initialization when an estimate of the asymmetry of the head has been determined.

The acquisition coefficient estimator 80 includes an error computation circuit 82 to compute an error signal based on the equalizer output ($U_k$) 84 and threshold signals 86 used to determine whether the equalizer output ($U_k$) 84 is at a positive peak ($\delta_k$=1) or a negative peak ($\delta_k$=−1). The error computation circuit 82 calculates the error signal to which an acquisition gain ($g_{ACQ}$) 88 is applied. The error signal is determined by adding the last positive peak as qualified by the positive tracking threshold 86 and the last negative peak as qualified by the negative tracking thresholds 86. The gain ($g_{ACQ}$) 88 adjusted error signal is added to the current value of delay register 89 at time K to produce a new value of acquisition coefficient ($\alpha$) 72. The coefficient ($\alpha$) 72 is determined from the output of delay register 89 and also from the output of delay register 98, depending upon the mode of operation. Equation (2) below provides one embodiment for the error computation circuit 82 to estimate an error signal ($c_k$) to which the acquisition gain ($g_{ACQ}$) 88 is applied, where $u_k^p$ is the last positive equalizer peak where the equalizer output $u_k$ is a peak that is greater than the positive tracking threshold ($\delta_k=1$) and where $u_k^n$ is the last negative equalizer peak where the equalizer output $u_k$ is a peak that is less than the negative tracking threshold ($\delta_k=-1$).

$$e_k = \begin{cases} u_{k-D(k)}^P + u_k^N & \text{if } \delta_k = -1 \\ 0 & \text{otherwise} \end{cases} \quad (2)$$

Thus, with equation (2), the error signal is calculated by summing the equalizer output for the last positive $u_k^P$ and negative $u_k^n$ peaks. Otherwise, if the sampled equalizer output is not at the negative peak, the error signal is zero.

The tracking coefficient estimator 90 includes an error computation circuit 92 to compute an error signal based on the input ($y_k$) 94 to the detector 64 and the detector output ($\hat{y}_k$) 67, which comprises the estimated, desired value of the read signal. The error computation circuit 92 calculates the error signal to which a tracking gain ($g_{TRK}$) 96 is applied. The gain ($g_{TRK}$) 96 adjusted error signal is added to the current value of the delay register 98 at time k produce a new value of tracking coefficient ($\alpha$) 72.

In FIG. 2, a Partial Response 4 (PR4) or an Extended Partial Response 4 (EPR4) maximum-likelihood detector may be used as the detector 64. The ideal EPR4 waveform has five ideal sample values: $-2, -1, 0, 1, 2$. The ideal PR4 waveform has three ideal sample values: $-2, 0, 2$. Thus, a $+2$ indicates the largest possible positive peak and $-2$ indicates the largest possible negative peak on either channel. Further, two pairs of signals may be used to generate the error generated by error computation block 92: $y_k$ 94 and $\hat{y}_k$ 67 when $\hat{y}_k=-2$ and $y_k$ 94 and $\hat{y}_k$ when $\hat{y}_{k-d}=2$. The signal $y_k$ 94 is the signal at the detector input 94 and $\hat{y}_k$ 67 is an estimate by the detector 64 of what that signal is supposed to be, e.g., for EPR4 $\{-2, -1, 0, +1, +2\}$. Since there is delay through the detector 64, $y_k$ 94 must be delayed to match $\hat{y}_k$ 67. If $\hat{y}_k=+2$, then a positive peak has occurred and y is stored in a register. When $\hat{y}_k=-2$, a negative peak has occurred and the error signal ($e_k$) is calculated by adding the last value of $\hat{y}_k$ 67 stored in the positive peak register and the current value of $\hat{y}_k$ 67 that is associated with a negative peak. For instance, suppose the signal received was 0 0 0 1.1 2.2 1.1 0 0 0 $-0.9$ $-1.8$ $-0.9$ 0 0 0 and the expected ideal waveform is 0 0 0 1 2 1 0 0 0 $-1$ $-2$ $-1$ 0 0 0. The first positive peak occurs when the ideal waveform equals $+2$ and the received value of 2.2 is stored in a delay register. The error signal ($e_k$) is generated when the next negative peak occurs; when the ideal waveform equals $-2$ and the received value is $-1.8$. Thus, the error is $2.2-1.8=0.4$. Further, there are many target channels for maximum-likelihood detectors besides EPR4 or PR4.

Equation (3) is a general mathematical description of the above embodiment for the error computation circuit 92 to calculate an error signal to which the tracking gain ($g_{TRK}$) 96 is applied.

$$e_k = \begin{cases} y_{k-d} + y_k & \text{if } \hat{y}_{k-d} = +2 \text{ and } \hat{y}_k = -2 \\ 0 & \text{otherwise} \end{cases} \quad (3)$$

In further embodiments, the $+2, -2$ notation is simply a matter of notational convenience for an EPR4 or PR4 channel. An EPR4 channel may be described by the coefficients $\{-128, -64, 0, +64, +128\}$ or any set of coefficients having the same relative relationship, and the peak coefficients should not be limited to $+2, -2$. Likewise, a PR4 channel may be described by the coefficients $\{-128, 0, +128\}$ or any set of coefficients having the same relative relationship, and again, the coefficients should not be limited to $+2, -2$.

With equation (3), the error signal ($e_k$) is calculated by summing the input signals 94 ($y_k$ and $y_{k-d}$) to the detector 64 separated by a delay when the signal outputs 96 ($\hat{y}_k$ and $\hat{y}_{k-d}$) of the detector 64 separated by a delay (d) are at positive and negative peaks.

Equation (4) below provides an alternative embodiment for the error computation circuit 92 to calculate an error signal to which the tracking gain ($g_{TRK}$) 96 is applied.

$$e_k = \begin{cases} +2 - y_k & \text{if } y_k > +2 \\ -2 - y_k & \text{if } y_k < -2 \\ \text{else} & A \cdot \sin(y_k) \end{cases} \quad (4)$$

With equation (4), the error signal ($e_k$) is calculated by: subtracting the input ($y_k$) 94 to the detector 64 from the positive peak value ($+2$) if the input signal ($y_k$) is greater than the ideal positive peak ($+2$); subtracting the input ($y_k$) 94 to the detector 64 from the negative peak value ($-2$) if the input signal ($y_k$) is less than the ideal negative peak ($-2$); or multiplying a value "A" between 0 and 1 times the sign $\{+1, -1\}$ of the input signal ($y_k$). The value "A" may be set to a low value, e.g., 0.1, such that if the input signal ($y_k$) is between peaks there is still a small error correction term ($e_k$).

In the described algorithms, the error signal used to calculate the coefficient ($\alpha$) may be set to zero or a small value if the signal upon which the error signal is based is not at a peak value. If the signal upon which the error signal is calculated is at a peak, then the error signal will be higher than for signals that are not calculated at a peak. Further, the gain applied 88, 96 also effects the response time of the ($\alpha$) calculation and hence the time to adjustment. In certain embodiments, the acquisition gain ($g_{ACQ}$) 88 may have a greater magnitude than the tracking gain ($g_{TRK}$) 96 because the desired time for the loop to acquire a stable value for ($\alpha$) is small, thus requiring a large gain for fast acquisition. Further, during tracking while data is being read the tracking gain ($g_{TRK}$) 96 may be dynamically adjusted downward as the asymmetry error declines.

At some point, when the asymmetry error declines to a sufficiently low value, the coefficient ($\alpha$) 72 may be set to a fixed value with no adaptation according to the logic of the acquisition coefficient 80 and tracking coefficient 90 estimators.

Figure 3:
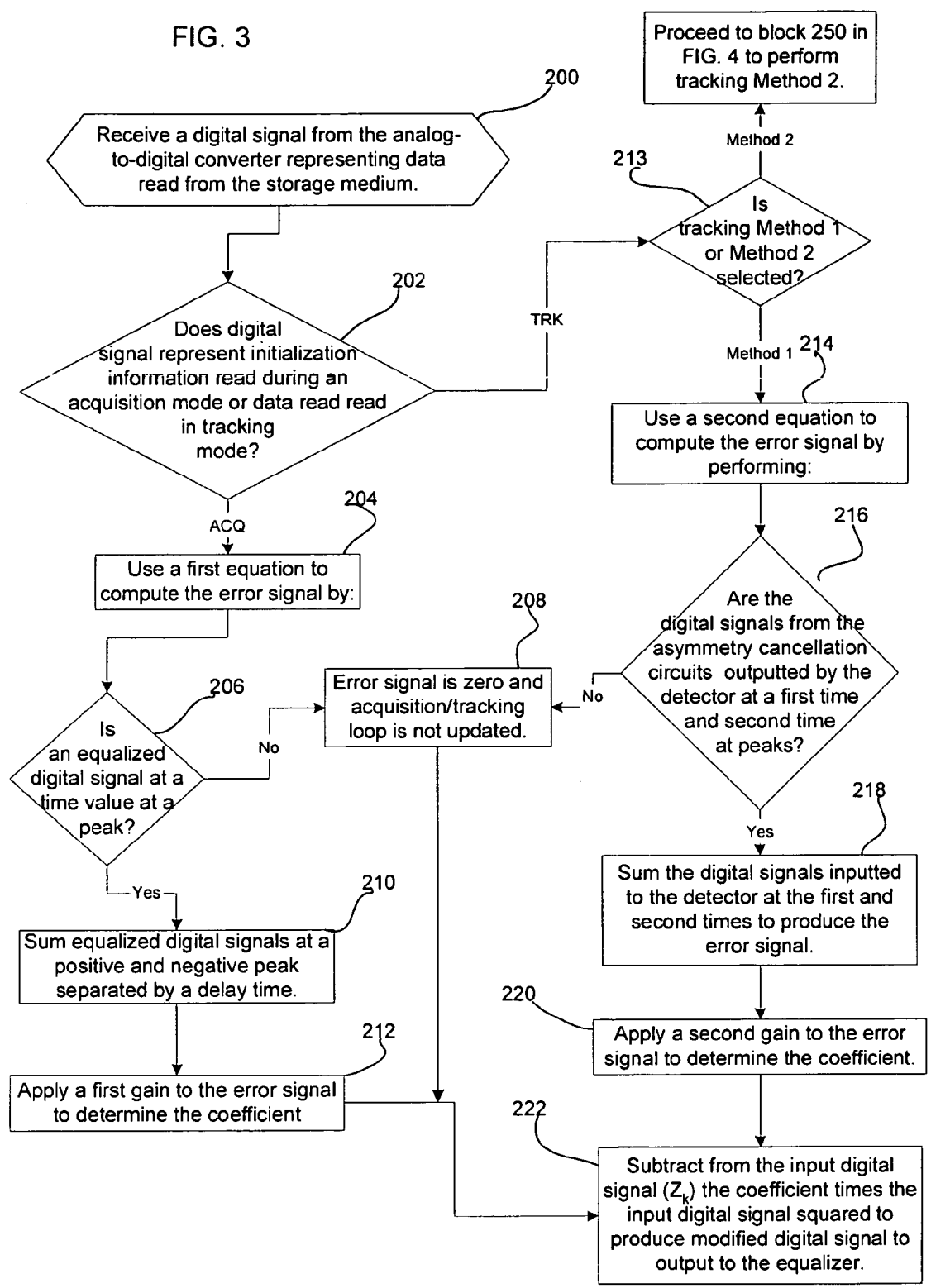
FIGS. 3 and 4 illustrate an embodiment of operations performed by an asymmetry cancellation component.

FIG. 3 illustrates operations performed by the logic and circuitry of the asymmetry cancellation circuit 52. Upon receiving (at block 200) a digital signal ($Z_k$) from the analog-to-digital converter (ADC) 54 representing data read from the storage medium, e.g., tape media. If (at block 202) the digital signal ($Z_k$) represents initialization data, such as DSS data, read during an acquisition mode, then a first equation is used (at block 204).

In one embodiment, this first equation may comprise the equation (2) discussed above. In this embodiment, a determination is made (at block 206) as to whether the equalized digital signal ($U_k$) from the equalizer 58 at a time value k is at a positive peak and greater than the positive tracking threshold ($\delta_k=1$) or a negative peak that is less than the negative tracking threshold ($\delta_k=-1$). If the equalizer 58 output ($U_k$) is not at a peak, then the error signal is zero and the Acquisition Coefficient Estimator 80 is not updated (at block 208). Control then proceeds to block 222 from 208, where $Z_k=Z_k-\alpha Z_k^2$. If (at block 206) the equalizer output ($U_k$) 84 is at a negative peak, then the error signal is calculated (at block 210) as the sum of the equalized digital signals at the last positive peak and the current negative peak which are separated by a delay time (D(k)), e.g., $u_{k-D(k)}^P + u_k^N$. A first gain ($g_{ACQ}$ 88) is applied (at block 212) to the error signal ($e_k$) to adjust the acquisition coefficient ($\alpha$) 72. In one embodiment, the coefficient ($\alpha$) 72 at time k comprises the sum of the first gain ($g_{ACQ}$ 88) times the error signal at time k, plus the value of the delay register 72 at time k. The delay register 89 at time k+1 gets the values of the acquisition coefficient ($\alpha$) 72 at time k. From block 212 or 208, control proceeds to block 222 to produce the output to the equalizer.

If (at block 202) the ADC 54 output ($Z_k$) represents tracking data, e.g., formatted customer data written on tape, then a second equation is used to compute the error signal ($e_k$) at time k. A determination is made (at block 213) as to whether to use a first method 1 or second method 2 to compute the tracking error signal. The indication of which of the multiple methods is used may be configured by an administrator and set in configuration settings used by the read channel 50. For method 1, the second equation is used (at block 214) to compute the error signal ($e_k$) at time k. In one embodiment, the error signal may be computed using equation (3) discussed above. In this embodiment, a determination is made (at block 216) as to whether the digital signals outputted by the detector 64 at a first time (k−d) and second time (k), e.g., output signals ($\hat{y}_k$ and $\hat{y}_{k-d}$), where d is a delay time between signals, are at peaks. If the signals are not at peaks, then (at block 208) the error signal is zero and the Tracking Coefficient Estimator 90 is not updated. From block 208, control proceeds to block 222 to produce the modified output signal according to the equation $\tilde{Z}_k = Z_k - \alpha Z_k^2$. Otherwise, if they are at peaks, the digital signals inputted to the detector 64 ($y_k$ and $y_{k-d}$) at the first and second times are summed (at block 218) to produce the error signal. A second gain ($g_{TRK}$ 96) is applied (at block 220) to the error signal ($e_k$) to adjust the coefficient ($\alpha$) register 98. In one embodiment, the coefficient ($\alpha$) 72 at time k comprises the sum of the second gain ($g_{TRK}$ 96) times the error signal at time k plus the value of the delay register 98 at time k. The delay register 98 at time k+1 gets the values of the tracking coefficient ($\alpha$) 72 at time k.

Once the coefficient ($\alpha$) 72 is determined (at block 220), then at block 222 the coefficient ($\alpha$) 72 times the input digital signal squared, i.e., ($\alpha \cdot Z_k^2$), is subtracted from the input digital signal ($Z_k$) to produce an output signal ($\tilde{Z}_k$) adjusted to reduce the effect of any asymmetrical signal.

Figure 4:
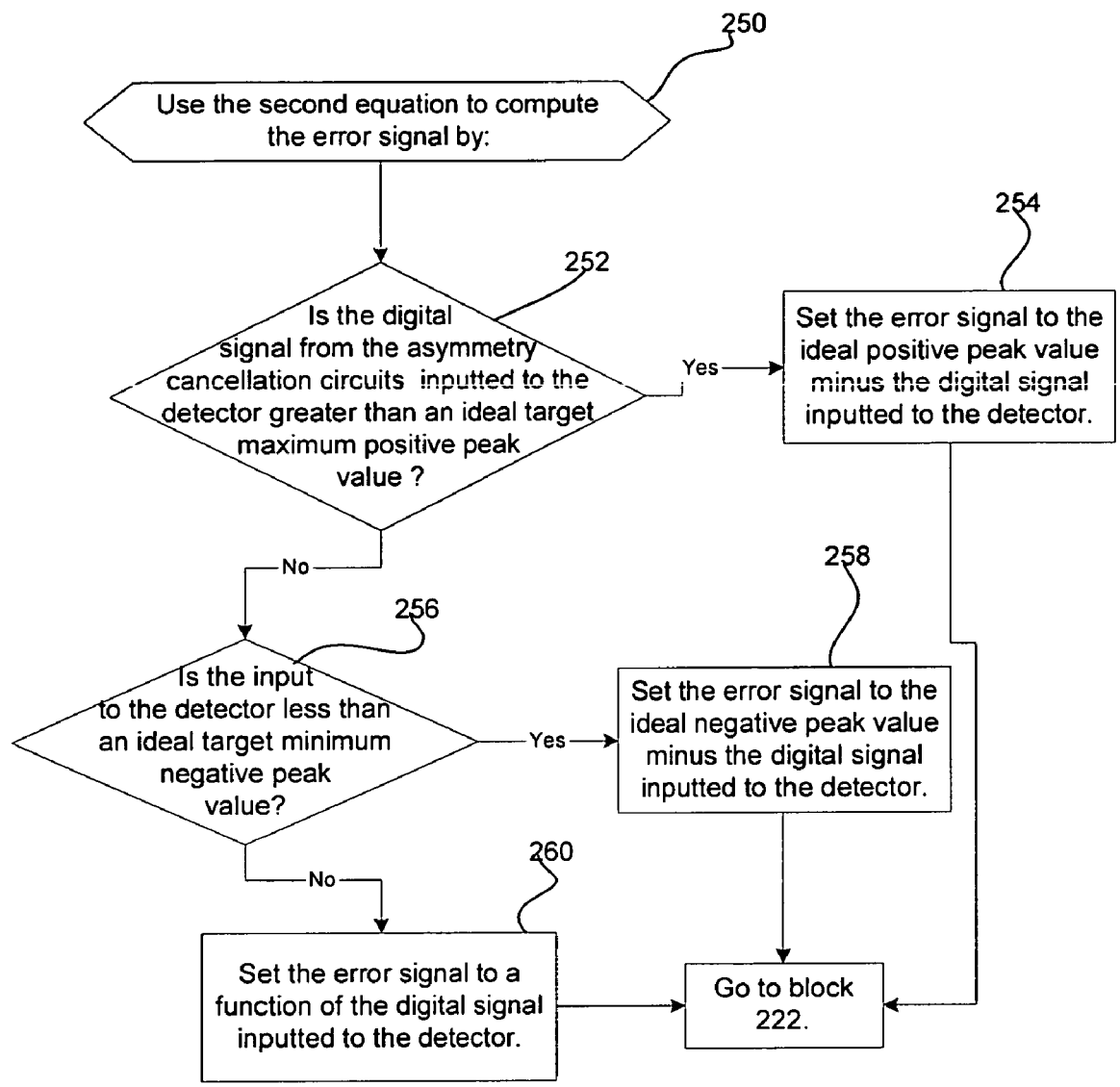

If (at block 213) a second method 2 was selected, then control proceeds to block 250 in FIG. 4 to calculate the error signal for the second equation using equation (4) discussed above. With the second method, the second equation is calculated (at block 250) by determining (at block 252) whether the digital signal from the asymmetry cancellation circuits inputted to the detector 65, signal $y_k$ 94, is greater than an ideal target maximum positive peak $\hat{y}_k$, e.g., +2. If so, the error signal is set (at block 254) to the ideal target positive peak $\hat{y}_k$ value minus the digital signal received at the input to the detector, e.g., +2−$y_k$. Otherwise, if (at block 256) the input $y_k$ to the detector 64 is less than the ideal target minimum negative peak value $\hat{y}_k$, e.g., −2, then the error signal is set (at block 258) to the ideal target negative peak value $\hat{y}_k$ minus the digital signal received at the input to the detector, e.g., −2−$y_k$. Otherwise, if the input $y_k$ to the detector 64 is between the ideal target maximum and minimum peak values, then the error signal is set (at block 260) to a variable "A" times the sign of $y_k$. After computing the error signal at block 254, 258 or 260, control proceeds to block 222 to user the error signal to calculate the coefficient ($\alpha$) 98.

Those of skill in the art will understand that changes may be made with respect to the components illustrated herein.

Further, those of skill in the art will understand that differing specific component arrangements may be employed than those illustrated herein.

The described components of the read channel and asymmetry cancellation circuit 52 may comprise discrete logic, ASIC (application specific integrated circuit), FPGA (field programmable gate array), custom processors, etc. Implementing the asymmetry cancellation operations in circuits reduces processing burdens on the controller 19 and other processors in the tape drive 10.

The described components of the read channel and the operations of the asymmetry cancellation circuit 52 described with respect to FIGS. 3 and 4 may also be implemented in subroutines in programs or other software implementations executed by a processor. Such programs implementing the operations of the asymmetry cancellation circuit 52, such as those operations shown in FIGS. 3 and 4, may be implemented in a computer readable medium, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.).

Components in FIGS. 1 and 2 shown as separate components may be implemented in a single circuit device or functions of one illustrated component may be implemented in separate circuit devices.

What is claimed is:

1. An asymmetry cancellation component in communication with an analog-to-digital converter method that receives an analog signal representing data read from a storage medium by a read head, wherein the component causes operations to be performed, the operations comprising:
    receiving a digital signal from the analog-to-digital converter representing data read from the storage medium;
    computing an error signal indicating an asymmetry in the digital signal; using the computed error signal to determine a coefficient by:
        applying a gain to the error signal to determine the coefficient; and
        adjusting the gain based on a magnitude of the error signal, wherein the gain decreases as the magnitude of the error signal decreases and increases as the magnitude of the error signal increases; and
    adjusting the digital signal using the coefficient to produce a corrected digital signal.

2. The asymmetry cancellation component of claim 1, wherein adjusting the digital signal comprises:
    applying the coefficient to the received digital signal to produce an adjusted digital signal; and
    subtracting the adjusted digital signal from the received digital signal to produce the corrected digital signal.

3. The asymmetry cancellation component of claim 1, wherein adjusting the error signal using the coefficient to produce the corrected digital signal comprises:
    squaring the received digital signal;
    multiplying the received digital signal by the coefficient to produce a coefficient adjusted value; and
    subtracting the coefficient adjustment value from the received digital signal to produce the corrected digital signal.

4. An asymmetry cancellation component in communication with an analog-to-digital converter method that receives an analog signal representing data read from a storage medium by a read head, wherein the component causes operations to be performed, the operations comprising:
receiving a digital signal from the analog-to-digital converter representing data read from the storage medium;
computing an error signal indicating an asymmetry in the digital signal;
using the computed error signal to determine a coefficient by:
applying a first gain to the error signal to determine the coefficient if the digital signal represents acquisition or initialization information received during an acquisition mode when head asymmetry is unknown; and
applying a second gain to the error signal to determine the coefficient if the digital signal represents data received during a tracking mode; and
adjusting the digital signal using the coefficient to produce a corrected digital signal.

5. An asymmetry cancellation component in communication with an analog-to-digital converter method that receives an analog signal representing data read from a storage medium by a read head, wherein the component causes operations to be performed, the operations comprising:
receiving a digital signal from the analog-to-digital converter representing data read from the storage medium;
computing an error signal indicating an asymmetry in the digital signal by:
using a first equation to compute the error signal if the digital signal represents acquisition or initialization information received during an acquisition mode when head asymmetry is unknown; and
using a second equation to compute the error signal if the digital signal represents data received during a tracking mode;
using the computed error signal to determine a coefficient; and
adjusting the digital signal using the coefficient to produce a corrected digital signal.

6. The asymmetry cancellation component of claim 5, wherein the digital signal from the asymmetry cancellation component is processed by a detector, and wherein the second equation computes the error signal by:
determining whether digital signals from the asymmetry cancellation components outputted by the detector at a first time and a second time are at peaks;
summing the digital signals inputted to the detector at the first and second times to produce the error signal in response to determining that the digital signals at the first and second times are at the peaks; and
setting the error signal to zero in response to determining that the digital signals at the first and second times are not at the peaks.

7. The asymmetry cancellation component of claim 5, wherein the digital signal from the asymmetry cancellation component is processed by a detector, and wherein the second equation computes the error signal by:
determining whether a digital signal from the asymmetry cancellation components inputted to the detector is greater than a positive ideal maximum peak value or less than a negative ideal maximum peak value;
setting the error signal to the positive peak value minus the digital signal inputted to the detector in response to determining that the digital signal inputted to the detector is greater than the positive ideal maximum peak value; and
setting the error signal to the negative peak value minus the digital signal inputted to the detector in response to determining that the digital signal inputted to the detector is less than the ideal minimum negative peak value.

8. The asymmetry cancellation component of claim 7, wherein the operations further comprise:
setting the error signal to a function of the digital signal inputted to the detector in response to determining that the digital signal is between the ideal maximum positive and ideal minimum negative peak values.

9. The asymmetry cancellation component of claim 5, wherein the digital signal from the asymmetry cancellation component is processed by a detector, and wherein the second equation computes the error signal using the digital signal inputted to the detector.

10. The asymmetry cancellation component of claim 5, wherein the digital signal from the asymmetry cancellation component is processed by an equalizer to produce an equalized digital signal, and wherein the first equation computes the error signal by:
determining whether a equalized digital signal at a time value is at a peak; summing equalized digital signals at a positive and negative peak separated by a delay time in response to determining that the equalized digital signals at the time value is at a negative peak.

11. The asymmetry cancellation component of claim 10, wherein the second equation computes the error signal by:
setting the error signal to zero in response to determining that the equalized digital signals at the time value is not at the negative peak.

12. A storage drive for performing Input/Output (I/O) operations with respect to a storage medium coupled to the storage drive, comprising:
a head to read data from the storage medium; and
an analog-to-digital converter method that receives an analog signal representing data read from the storage medium by the read head; and
an asymmetry cancellation component enabled to cause operations to be performed, the operations comprising:
receiving a digital signal from the analog-to-digital converter representing data read from the storage medium;
computing an error signal indicating an asymmetry in the digital signal;
using the computed error signal to determine a coefficient by:
applying a first gain to the error signal to determine the coefficient if the digital signal represents acquisition or initialization information received during an acquisition mode when head asymmetry is unknown; and
applying a second gain to the error signal to determine the coefficient if the digital signal represents data received during a tracking mode; and
adjusting the digital signal using the coefficient to produce a corrected digital signal.

13. The storage drive of claim 12, wherein the asymmetry cancellation component adjusts the digital signal by:
applying the coefficient to the received digital signal to produce an adjusted digital signal; and
subtracting the adjusted digital signal from the received digital signal to produce the corrected digital signal.

14. The storage drive of claim 12, wherein the asymmetry cancellation component adjusts the error signal using the coefficient to produce the corrected digital signal by:
squaring the received digital signal;
multiplying the received digital signal by the coefficient to produce a coefficient adjusted value; and subtracting the coefficient adjusted value from the received digital signal to produce the corrected digital signal.

15. A storage drive for performing Input/Output (I/O) operations with respect to a storage medium coupled to the storage drive, comprising:
a head to read data from the storage medium;
an analog-to-digital converter method that receives an analog signal representing data read from the storage medium by the read head; and
an asymmetry cancellation component enabled to cause operations to be performed, the operations comprising:
receiving a digital signal from the analog-to-digital converter representing data read from the storage medium;
computing an error signal indicating an asymmetry in the digital signal;
using the computed error signal to determine a coefficient by:
applying a gain to the error signal to determine the coefficient; and
adjusting the gain based on a magnitude of the error signal, wherein the gain decreases as the magnitude of the error signal decreases and increases as the magnitude of the error signal increases; and
adjusting the digital signal using the coefficient to produce a corrected digital signal.

16. A storage drive for performing Input/Output (I/O) operations with respect to a storage medium coupled to the storage drive, comprising:
a head to read data from the storage medium;
an analog-to-digital converter method that receives an analog signal representing data read from the storage medium by the read head; and
an asymmetry cancellation component enabled to cause operations to be performed, the operations comprising:
receiving a digital signal from the analog-to-digital converter representing data read from the storage medium;
computing an error signal indicating an asymmetry in the digital signal by:
using a first equation to compute the error signal if the digital signal represents acquisition or initialization information received during an acquisition mode when head asymmetry is unknown; and
using a second equation to compute the error signal if the digital signal represents data received during a tracking mode;
using the computed error signal to determine a coefficient; and
adjusting the digital signal using the coefficient to produce a corrected digital signal.

17. The storage drive of claim 16, further comprising:
a detector to process the digital signal from the asymmetry cancellation component; and
wherein the second equation computes the error signal by:
determining whether digital signals from the asymmetry cancellation components outputted by the detector at a first time and a second time are at peaks;
summing the digital signals inputted to the detector at the first and second times to produce the error signal in response to determining that the digital signals at the first and second times are at the peaks; and
setting the error signal to zero in response to determining that the digital signals at the first and second times are not at the peaks.

18. The storage drive of claim 16, further comprising:
a detector to process the digital signal from the asymmetry cancellation component; and
wherein the second equation computes the error signal by:
determining whether a digital signal from the asymmetry cancellation components inputted to the detector is greater than a positive ideal maximum peak value or less than a negative ideal maximum peak value;
setting the error signal to the positive peak value minus the digital signal inputted to the detector in response to determining that the digital signal inputted to the detector is greater than
setting the error signal to the negative peak value minus the digital signal inputted to the detector in response to determining that the digital signal inputted to the detector is less than the ideal minimum negative peak value.

19. The storage drive of claim 18, wherein the asymmetry cancellation component further causes operations comprising:
setting the error signal to a function of the digital signal inputted to the detector in response to determining that the digital signal is between the ideal maximum positive and ideal minimum negative peak values.

20. The storage drive of claim 16, further comprising:
a detector to process the digital signal from the asymmetry cancellation component, wherein the second equation computes the error signal using the digital signal inputted to the detector.

21. The storage drive of claim 16, further comprising:
an equalizer to process the digital signal from the asymmetry cancellation component to produce an equalized digital signal; and
wherein the first equation computes the error signal by:
determining whether a equalized digital signal at a time value is at a peak; and
summing equalized digital signals at a positive and negative peak separated by a delay time in response to determining that the equalized digital signals at the time value is at a negative peak.

22. The storage drive of claim 21, wherein the second equation computes the error signal by:
setting the error signal to zero in response to determining that the equalized digital signals at the time value is not at the negative peak.

* * * * *